United States Patent
Shachter

[15] 3,654,820
[45] Apr. 11, 1972

[54] STEERING SYSTEM WITH POWERED RECOVERY MECHANISM
[72] Inventor: Moses Shachter, Oak Park, Mich.
[73] Assignee: Ford Motor Company, Dearborn, Mich.
[22] Filed: July 6, 1970
[21] Appl. No.: 52,307

[52] U.S. Cl..................................................74/495, 280/94
[51] Int. Cl.................................................................B62d 1/16
[58] Field of Search........................................74/495; 280/94

[56] References Cited

UNITED STATES PATENTS 1,700,598   1/1929   Royce.......................................74/495

Primary Examiner—Milton Kaufman
Attorney—John R. Faulkner and Clifford L. Sadler

[57] ABSTRACT

A steering system for a motor vehicle which in its presently preferred embodiment has a power steering gear, a steering wheel and a steering shaft connecting the steering wheel to the steering gear. The steering shaft has a worm gear portion and a ball nut operably engaging the worm gear portion. A coil spring engages the nut and exerts a force tending to maintain the steering wheel and steering shaft in a central position.

4 Claims, 7 Drawing Figures

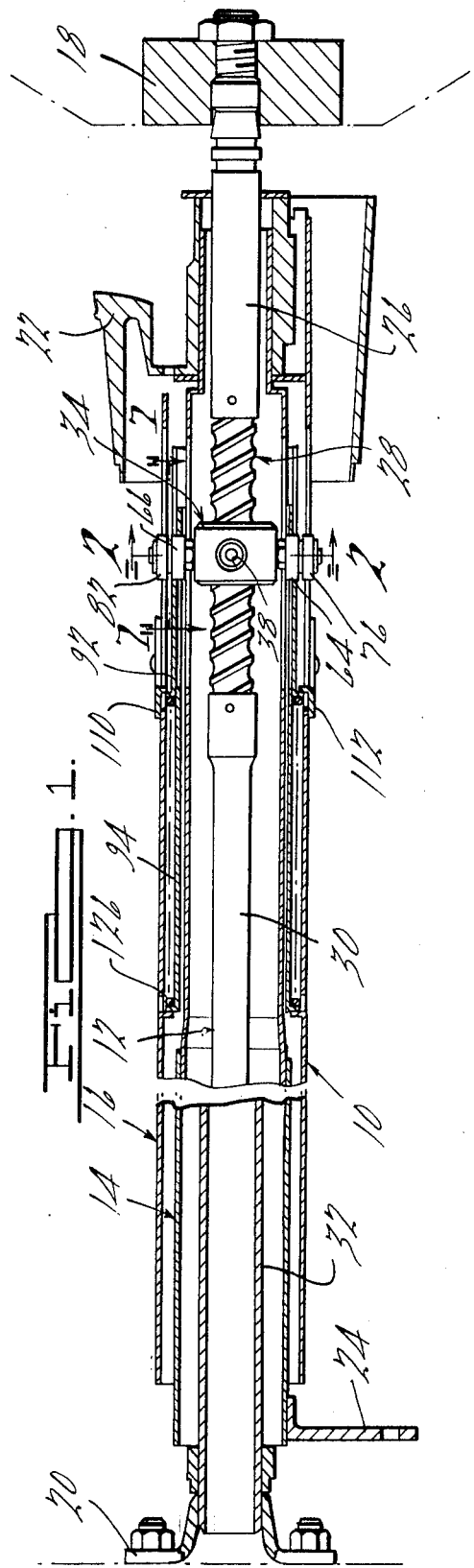
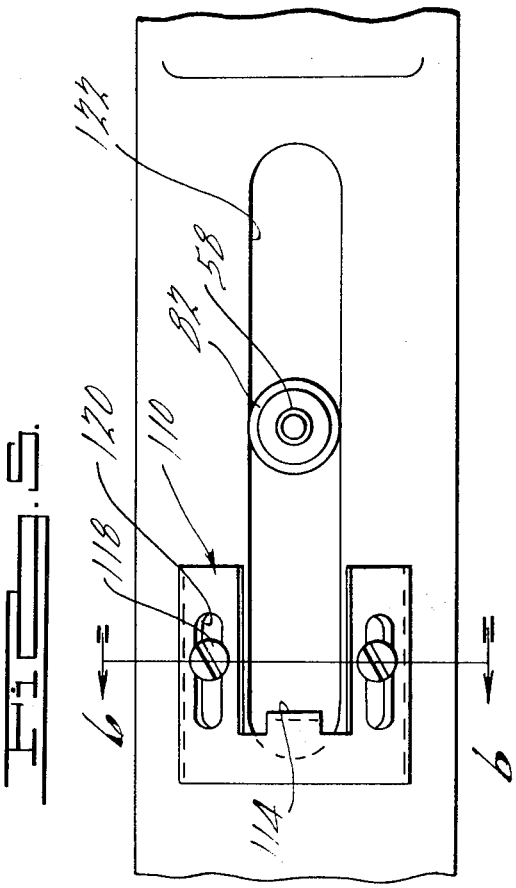

INVENTOR.
Moses Shachter
BY John R. Faulkner
Clifford L. Sadler
ATTORNEYS.

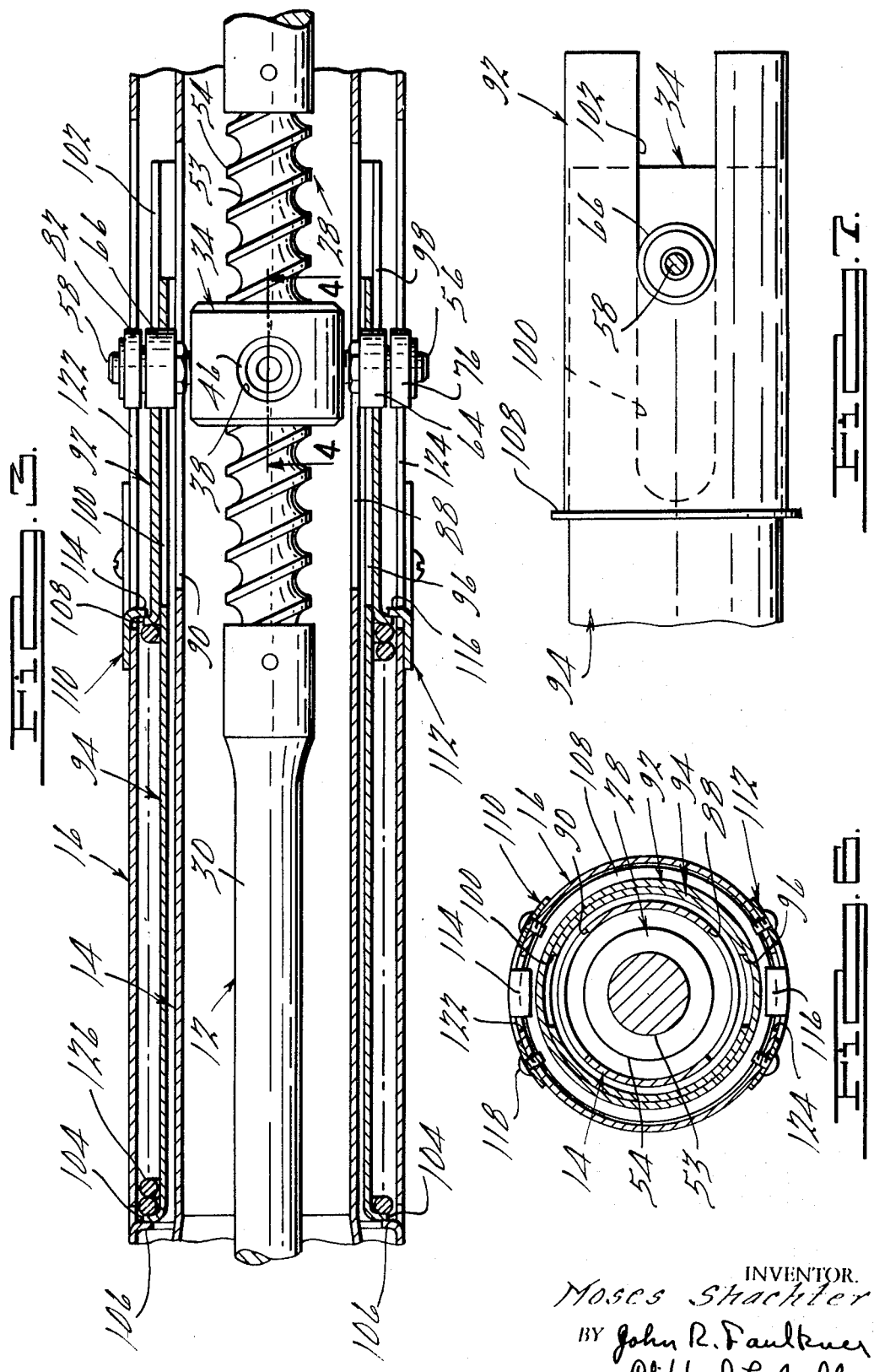

STEERING SYSTEM WITH POWERED RECOVERY MECHANISM

BACKGROUND OF THE INVENTION

Two principal types of power steering reaction or means of providing steering "feel" have been used in passenger cars. Historically, the first approach was the use of hydraulic reaction. In this system, the hydraulic reaction area is provided on the steering servo control valve. The hydraulic pressure that is furnished to the power cylinder also acts upon the reaction area, thereby producing a reaction force proportional to the amount of power boost.

This construction provides a linear relationship between the reaction force (steering effort) and output torque. In the early period of power steering, this linear relationship was favored. The characteristics of hydraulic reaction are: (1) light steering effort for corrective steering; (2) good recover action; (3) relatively high parking effort since the output torque at parking is about three times greater than for cornering with the steering effort correspondingly greater; and (4) a moderate amount of feedback from road disturbances to the front wheels.

As the demand for lower steering effort increased, the use of hydraulic reaction was extended by the addition of a pressure reducing valve to control the hydraulic pressure acting upon the reaction area. This valve, sometimes known as a "parking valve", provides a linear reaction during corrective steering and cornering but then limits the reaction pressure as the output torque increases above that encountered in cornering. This gives the designer additional freedom in establishing the relationship between steering effort and output torque.

Another development in producing and controlling steering effort in power steering systems is torsion spring reaction, such as disclosed in U.S. Pat. No. 3,292,499 issued Dec. 20, 1966 to James J. Duffy. The metering of the control valve is designed to produce a pressure output across the power cylinder proportional to the square of the valve displacement. The deflection of the torsion spring is proportional to the steering effort. This results in the output torque being proportional to the square of the steering effort. Characteristics of torsion spring reaction are: (1) light steering effort for corrective steering; (2) fair recovery; (3) moderate parking effort; and (4) low feedback from road disturbances.

In each of these two common approaches, the designer is restrained by some relationship between corrective steering effort, recovery, feedback and parking effort so that he cannot control these factors independently.

BRIEF SUMMARY OF THE DISCLOSURE

In view of the state of the art, the principal objective of this invention is to present a power steering system construction that provides low steering effort, outstanding recovery and elimination of feedback. This is accomplished in the present invention by imposing a spring produced centering torque upon the steering shaft and eliminating or minimizing all other reaction torques.

With respect to recovery in a properly designed steering mechanism, the steering wheel of a moving automobile has a tendency to return to the central or straight-ahead position. This is usually accomplished by the aligning torque produced by the caster angle of the steering knuckle acting on the front wheels which tends to return the system to the straight-ahead position. However, in some cases friction in the steering mechanism prevents the return of the steering wheel to the center. The mechanism of this invention (that is, a spring produced centering torque acting upon the steering shaft) is intended to facilitate unconditional return of the steering wheel to its central position.

In the presently preferred embodiment of this invention, the steering shaft is provided with a large lead threaded or worm gear portion which is engaged by balls of a ball nut. A pair of trunnions extend from the ball nut and support a pair of roller bearings. The roller bearings are situated in axially extending slots in the stationary outer tube of the steering column.

A pair of telescopic concentric flanged tubes have slots that accommodate resilient bushings supported by the trunnions. A precompressed helical spring is contained between the flanges of the concentric tubes. A pair of axially spaced tabs are formed on the stationary steering column jacket and each one of the pair of tubes engages one of the tabs. The tubes also engage the trunnions of the ball nut. The spring interposed between the tubes, and acting through the tubes, exerts a spring force on the ball nut that is transmitted to the steering shaft and urges the steering shaft to a center position.

The mechanism comprising the ball nut and worm gear portion of the steering shaft acts as a motion translating device which converts the axial force of the spring imposed upon the nut to a force tending to rotate the steering shaft.

When the steering shaft is rotated by the vehicle driver, the ball nut will not rotate due to its engagement with the slots in the stationary jacket. Being unable to rotate, the ball nut will be displaced axially and this will compress the coil spring interposed between the telescopic tubes. Thus, rotation of the steering wheel will be against the force of the coil spring.

The reaction forces of the power steering gear attached to the steering shaft are designed to be of a substantially lower level than in a conventional steering system so that the steering efforts at the steering wheel are produced mostly by the coil spring and are within conventional limits.

When the vehicle operator removes his hands from the steering wheel, the coil spring in the column acting on the ball nut will cause the steering shaft to rotate until it reaches its central position. Rotation of the steering shaft caused by the coil spring acts through the power steering gear to center the front steerable wheels of the vehicle.

BRIEF DESCRIPTION OF THE DRAWINGS

The many objects and advantages of a steering system of this invention will become apparent upon consideration of the following detailed discussion and the accompanying drawings, in which:

FIG. 1 is a sectional view of a steering column for a motor vehicle steering system incorporating a spring powered recovery device constructed in accordance with the invention;

FIG. 5 is a top plan view of a portion of the steering column of FIG. 1;

FIG. 6 is a sectional view taken along section lines 6—6 of FIG. 5;

FIG. 7 is a top plan view of an internal portion of the column mechanism shown in FIG. 5; and FIG. 8 is a graph showing the relationship between angular deflection of the steering wheel versus steering effort.

DETAILED DESCRIPTION OF A PREFERRED EMBODIMENT

Figure 2:
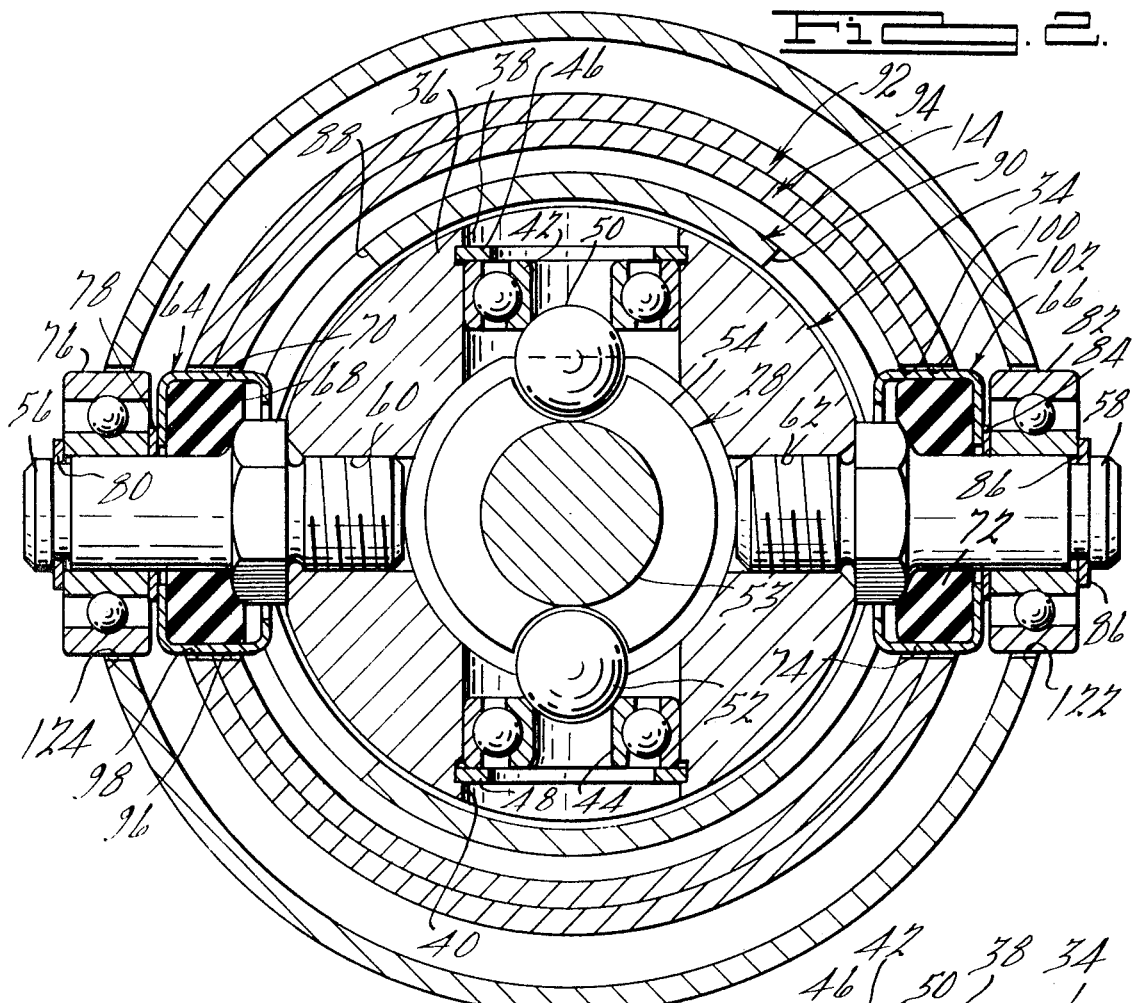
FIG. 2 is a sectional view taken along section lines 2—2 of FIG. 1.

Referring now to the drawings, wherein the presently preferred embodiment is illustrated, FIG. 1 discloses a steering column constructed in accordance with this invention. FIG. 1 discloses a steering column 10 that includes a steering shaft 12. As will be explained later, the shaft 12 is formed of a plurality of shaft sections. The steering shaft 12 is rotatably supported within a transmission shift tube 14 which, in turn, is rotatably supported within a stationary outer tube or jacket 16.

The outer tubular jacket 16 of the steering column 10 is secured to vehicle support structure such as a bracket (not shown) situated under the instrument panel of the motor vehicle.

The upper end of the steering shaft 12 is connected to a steering wheel 18. The lower end of the shaft 12 is connected to a power steering gear by means of a flexible coupling 20.

The transmission shift tube 14 is connected to a transmission shift collar 22 at its upper end which, in turn, connected to a transmission shift lever (not shown) situated to be manipulated by the vehicle operator. The lower end of the tube 14 connects to the vehicle's transmission by means of linkage that connects to a lever arm 24. This mechanism permits the vehicle driver to control the operation of the vehicle's transmission.

The steering shaft 12 is fabricated with a plurality of shaft sections. An upper shaft section 26 is formed of solid bar stock and is connected to the steering wheel 18. An intermediate shaft portion 28 is formed with helical threads having a large lead in the manner of a worm gear. The threaded shaft portion 28 is connected to the upper shaft portion 26 and to a solid intermediate portion 30. The lower end of the steering shaft assembly 12 comprises a tubular shaft section 32 which has its lower end secured to the flange 20 of a universal coupling.

Shaft sections 30 and 32 are constructed to be telescopically connected and include frangible means for joining the shaft sections 30, 32 together. In the event of an impact upon the steering wheel or, in the alternative, upon the lower flexible coupling flange 20, the frangible means connecting the shaft sections 30 and 32 will fracture. As a consequence, the shaft sections 30 and 32 will telescope and foreshorten in length.

Figure 4:
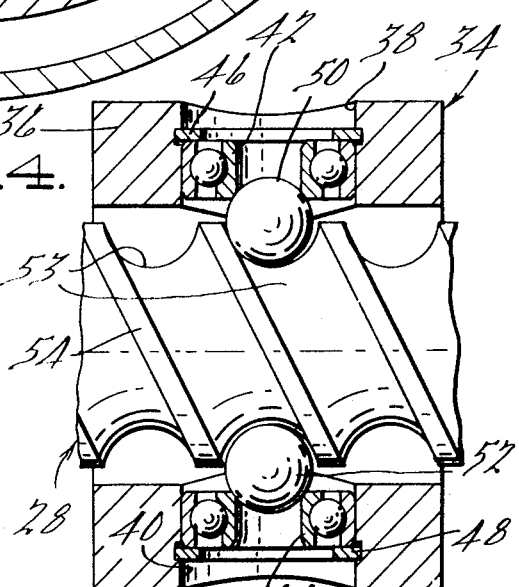
FIG. 4 is a view taken along section lines 4—4 of FIG. 3 showing the engagement of a portion of a ball nut with the worm gear of the steering shaft.

A ball nut assembly 34 engages the threaded shaft portion 28. The structure of the ball nut assembly 34 is best seen in FIGS. 2 and 4. The nut includes a housing portion 36 with diametrically aligned bores 38 and 40. Anti-friction bearings 42 and 44 are retained in the bores 40 by means of snap rings 46 and 48. A pair of balls 50 and 52 engage the inner race of the ball bearings 42, 44 and are seated or received in the helical grooves 53 between the threads 54 of the shaft portion 28.

A pair of trunnions 56 and 58 are threadedly received in bores 60 and 62 and are arranged at a right angle to the axis of the bores 38 and 40 which receive the ball bearings 42, 44. Resilient bushings 64 and 66 are mounted on the trunnions 56, 58. Bushing 64 includes a rubber element 68 and a metal casing 70. Similarly, bushing 66 includes rubber element 72 and a sheet metal casing 74. The inner race of a ball bearing 76 is mounted on the trunnion 56. It is positioned outwardly from the bushing 64 by a thrust washer 78. The bearing 76 is retained on the trunnion 56 by means of a snap ring 80. In a similar manner, bearing 82 is located between the thrust washer 84 and a snap ring 86 on the trunnion 58.

The housing portion 36 of the ball nut is located within the shift tube 14. The shift tube 14 is provided with axially extended openings 88 and 90 (see FIG. 2) through which the trunnions 56, 58 and the bearing assemblies associated therewith protrude. The openings 88 and 90 are of sufficient width that the bushings 64 and 66 mounted on the trunnions do not interfer with the free operation of the shift tube 14.

Outer and inner telescopic concentric tubular members 92 and 94 surround the shift tube 14. Tubes 94 and 92 have a first set of aligned axially extending slots 96 and 98 as well as a second set of axially extending aligned slots 100 and 102 (see FIGS. 2 and 7).

Figure 3:
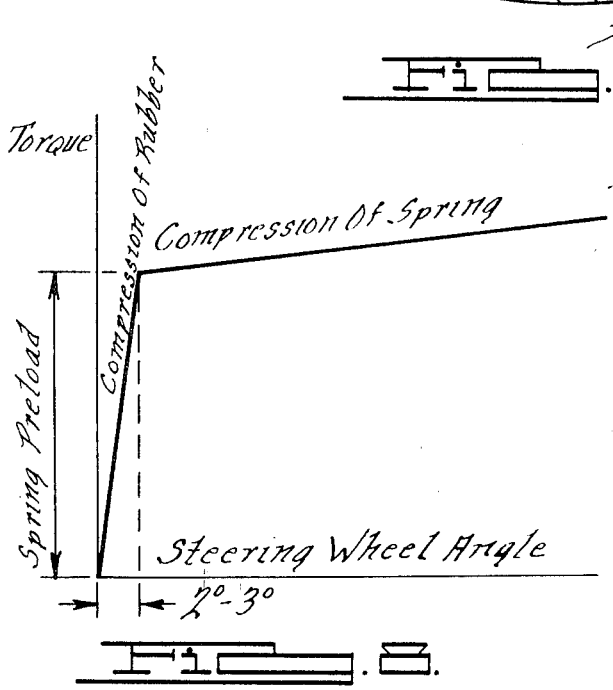
FIG. 3 is an enlarged sectional view of a portion of the steering column shown in FIG. 1.

Bushing 64 of trunnion 56 is situated in the slots 96 and 98 whereas bushing 66 of trunnion 58 is situated in slots 100 and 102. As seen in FIG. 3, slots 98 and 102 of tubular member 92 are open-ended and extend from a midpoint of the tube 92 to its right-hand extremity. By contract, slots 96 and 100 of tube 94 are close-ended, that is, the axial limits of the slots 96 and 100 are spaced from the ends of the tube 94.

Referring to FIG. 3, the lower or left-hand end of the inner tube 94 has an outwardly turned flange 104. The flange 104 is constructed to engage a plurality of inwardly extending tabs 106 formed out of the stationary outer tubular jacket 16. The tabs 106 function as stop members which, in cooperation with the flange 104, limit movement of the inner member 94.

The outer tubular member 92 has an outwardly extending flange 108. A pair of spaced stop members 110 and 112 each have inwardly directed tabs 114 and 116. The stop members 110 and 112 are fastened to the tubular outer jacket 16 by means of machine screws such as 118. The stop members 110, 112 have elongated openings such as 120 through which the screws 118 pass. This latter construction permits the stop members 110 and 112 to be adjusted in axial position along the tubular jacket 16 of the steering column 10 for a purpose which will be described later.

The tubular jacket 16 has a pair of aligned slots 122 and 124 that extend in an axial direction. As seen in FIG. 3, the tabs 114, 116 of stop members 110, 112 extend radially inwardly through the slots 122 and 124 to a position where they are engaged by the flange 108.

A coil spring 126 is arranged concentrically about the inner one 94 of the pair of telescopic tubular members 92, 94 and within the outer tubular jacket 16. The coil spring 126 exerts an axial force in the left-hand direction upon the flange 104 of tube 94 urging it against the tabs 106. The opposite end of the coil spring 126 engages the flange 108 of tube 92 and urges it against the tabs 114 and 116 of stop members 110 and 112.

The roller bearings 76 and 82 of trunnions 56 and 58 are received in the slots 122 and 124 with the bearings in rolling engagement with the edges of the slots.

When the front wheels of a vehicle having the steering system of the present invention are aligned in the straight-ahead position, the ball nut 34 is situated on the portion 28 of steering shaft 12 as illustrated in FIGS. 1 and 3. The tabs 106 of outer column jacket 16 are formed so that when the flange 104 of tube 94 is seated against it, the right-hand extremity of slots 96 and 100 engage the bushings 66 and 64, respectively. Similarly, stop members 110 and 112 are adjusted so that the tabs 114 and 116 are properly located to position the tube 92 with the left edge of the slots 98 and 102 in engagement with the bushings 64 and 66, respectively. The coil spring 126, exerting a force on the telescopic tubes 92 and 94, tends to maintain the relative position of the spring powered steering recovery components and particularly of the tubes 92, 94 and nut 34 as shown in FIG. 3.

OPERATION

In a properly designed steering mechanism, the steering wheel of a moving vehicle has the tendency to return to the center or recover its straight-ahead position. This return to center is usually accomplished by the aligning torque acting on the front wheels which is achieved by arranging the steering knuckle with the proper caster angle. However, in some cases friction in the steering mechanism prevents the return of the steering wheel to the center. The mechanism of the present invention is intended to facilitate the return or recovery of the steering system.

The steering shaft 12 has a large lead threaded portion 28 that accommodates the freely rotating balls 50 and 52 of the ball nut 4. The trunnions 56, 58 are rigidly attached to the ball nut 34 and the two rubber bushings 64, 66 are mounted on the trunnions 56, 58. Slots 122, 124 are formed in the outer tubular jacket 16 of the steering column to accommodate the two roller bearings 76, 82 mounted on the ends of the trunnions 56, 58.

The two telescopic concentric flanged tubes 92, 94 have slots that accommodate the rubber bushings 64, 66. The precompressed helical spring 126 is contained between the flanges 104, 108 of the tubes 94, 92, respectively. The spring 126 tends to keep the outer concentric tube 92 in the extreme right-hand position with its flange 108 pressed against the tabs 114, 116 of the two stop members 110, 112. The spring 126 also tends to keep the inner concentric tube 94 in an extreme left-hand position with its flange 104 pressed against the two tabs 106 made directly in the column tube 16.

The positions of the stops 110, 112 are adjusted so that when the steering wheel 18 is in a central position, each of the bushings 64, 66 is clamped with no clearance in the axial direction between the axial limits of the aligned slots 100 and 102 and between the limits of slots 96 and 98 in the tubes 94 and 92 as seen in FIGS. 3 and 7.

The transmission control tube 14 has two wide slots 88 and 90 through which the trunnions 56, 58 protrude. Due to the width of these slots, the trunnions 56, 58 do not interfere with the motion of the transmission shift tube 14.

When the driver turns the steering wheel 18 and the steering shaft 12, the ball nut 34 cannot rotate but instead moves in an axial direction with the ball bearings 82, 76 rolling along the edges of the slots 122, 124 in the stationary tubular outer jacket 16. When the ball nut 34 moves to the left, in response to the turning of the steering wheel 18 to the left, the bushings 64, 66 force the outer flange concentric tube 92 to the left by pushing against the left-hand edge of the slots 98 and 102. This causes flange 108 of tube 92 to compress the coil spring 126 against the stationary flange 104 of the inner concentric tube 94.

When the ball nut 34 moves to the right in response to rotation of the steering wheel 18 and the steering shaft 12 to the right, the bushings 64, 66 force the inner flanged tube 94 to the right by pushing against the right-hand edge of the slots 96 and 100. This causes flange 104 of tube 94 to compress the spring 126 against the stationary flange 108 of tube 92 which is seated against the tabs 114, 116 of stop members 110, 112.

In each case, energy stored in the spring 126 after the steering wheel 18 has been rotated, acting through either flanged tube 92 or 94, urges the ball nut 34 to return to its initial axial position. Due to the threaded engagement between the nut 34 and shaft portion 28, the axial force of the spring 126 will urge the steering shaft 12 to be angularly displaced back to its center position whenever the driver releases the wheel 18. In a steering system with a hydraulic power booster, the above-described mechanism will assure the return of the steering wheel and the front vehicle wheels to the straight-ahead position even when the vehicle is parked (assuming that the engine is running and the power steering system is operative). The force of the spring 126, acting upon the nut 34, will be sufficient to actuate the power steering gear.

Due to the rubber 68, 72 in bushings 64, 66 and the preload of the spring 126 which has a large number of coils, the graphical interpretation of the relationship between the torque generated by the spring forces of the mechanism and the steering wheel angle is as shown in FIG. 8. The compression of the rubber 68, 72 in bushings 74, 76 that precedes the compression of the coil spring 126 assures a soft start at the beginning of the turn and a soft stop at the end of the return or recovery, thus avoiding undesirable impact.

The foregoing description presents the presently preferred embodiment of this invention. Modifications and alterations may occur to those skilled in the art that will come within the scope and spirit of the following claims.

I claim:

1. A steering system for a motor vehicle having a steering column assembly rotatably supporting a steering shaft, said shaft having one end constructed to be connected to a manual steering wheel and a second end constructed to be connected to the dirigible road wheels of said vehicle, said steering shaft having a neutral position corresponding to the straight-ahead position of said dirigible wheels, said shaft having a threaded portion, a nut engaging said threaded portion, said column assembly including a stationary tubular jacket having longitudinally extending slots, trunnion means extending from said nut and disposed within the slots of said jacket, said nut being axially displaced upon angular displacement of said shaft, inner and outer telescopic concentric tubular members, said tubular members having aligned axially extending slots engaging said trunnion means, spring means interposed between said inner and outer tubular members, first stop means on said jacket preventing displacement of said inner tubular member in a first direction, second stop means on said jacket preventing displacement of said outer tubular member in a second direction, said spring means exerting a spring force on said tubular members and said tubular members being constructed to transmit said spring force to said nut whereby when said steering shaft is angularly displaced from said neutral position said nut is spring biased to urge said shaft to return to said neutral position.

2. A steering system for a motor vehicle having a steering column assembly rotatably supporting a steering shaft, said shaft having one end constructed to be connected to a manual steering wheel and a second end constructed to be connected to the dirigible road wheels of said vehicle, said steering shaft having a neutral position corresponding to the straight-ahead position of said dirigible wheels, said shaft being angularly displaceable from said neutral position to cause said dirigible wheels to assume either a left or right steering angle, said shaft having a threaded portion, a nut engaging said threaded portion, said nut being axially displaced upon angular displacement of said shaft, inner and outer telescopic concentric tubular members engaging said nut, a coil spring concentrically disposed about the axis of said shaft and interposed between said inner and outer tubular members, said spring exerting a spring force on said tubular members, said tubular members being constructed to transmit said spring force to said nut whereby when said steering shaft is angularly displaced from said neutral position said nut is spring biased to urge said shaft to return to said neutral position.

3. A steering system for a motor vehicle having a steering column assembly rotatably supporting a steering shaft, said shaft having one end constructed to be connected to a manual steering wheel and a second end constructed to be connected to the dirigible road wheels of said vehicle, said steering shaft having a neutral position corresponding to the straight-ahead position of said dirigible wheels, inner and outer telescopic concentric tubular members, a motion translating means interposed between said tubular members and engaging said steering shaft, said motion translating means being constructed to convert angular displacement of said shaft in a first angular direction to axial displacement of one of said tubular members in a first axial direction, said motion translating means being further constructed to convert angular displacement of said shaft in a second angular direction to axial displacement of the other of said tubular members in a second axial direction, a coil spring interposed between said inner and outer tubular members, said coil spring being constructed to urge said one tubular member is said second axial direction and said other tubular member in said first axial direction, whereby when said steering shaft is angularly displaced from said neutral position said spring is compressed and exerts a spring force urging said steering shaft back to said neutral position.

4. A steering system for a motor vehicle having a steering column assembly rotatably supporting a steering shaft, said shaft having one end constructed to be connected to a manual steering wheel and a second end constructed to be connected to the dirigible road wheels of said vehicle, said steering shaft having a neutral position corresponding to the straight-ahead position of said dirigible wheels, a motion translating means engaging said steering shaft, said motion translating means being axially displaceable in response to angular displacement of said shaft, a coil spring having both of its ends engaging said motion translating means, said coil spring and said motion translating means being constructed to exert a spring force upon said steering shaft urging said steering shaft to return to its neutral position in response to the angular displacement of said shaft in either direction of rotation from its said neutral position.

* * * * *